US010619860B2

(12) United States Patent
Armstrong

(10) Patent No.: US 10,619,860 B2
(45) Date of Patent: Apr. 14, 2020

(54) RANGE APPLIANCE AND SENSOR ASSEMBLY

(71) Applicant: Haier US Appliance Solutions, Inc., Wilmington, DE (US)

(72) Inventor: James Lee Armstrong, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 706 days.

(21) Appl. No.: 15/340,010

(22) Filed: Nov. 1, 2016

(65) Prior Publication Data

US 2018/0116437 A1 May 3, 2018

(51) Int. Cl.
*F24C 7/08* (2006.01)
*G01K 1/02* (2006.01)
*G01K 11/26* (2006.01)
*A47J 36/32* (2006.01)

(52) U.S. Cl.
CPC ............ *F24C 7/082* (2013.01); *A47J 36/321* (2018.08); *G01K 1/024* (2013.01); *G01K 11/265* (2013.01); *G01K 2207/06* (2013.01)

(58) Field of Classification Search
CPC ........ F24C 7/082; G01K 1/024; G01K 11/265
See application file for complete search history.

(56) References Cited

U.S. PATENT DOCUMENTS

| 3,375,819 | A | 4/1968 | Davis |
| 4,705,019 | A | 11/1987 | Beach et al. |
| 6,236,025 | B1 * | 5/2001 | Berkcan ............ G05D 23/27535 |
| | | | 219/483 |
| 6,698,923 | B2 | 3/2004 | Bedetti et al. |
| 2014/0098835 | A1 | 4/2014 | Herzog et al. |
| 2015/0001203 | A1 * | 1/2015 | Brown .................. F24C 7/082 |
| | | | 219/391 |
| 2015/0114962 | A1 | 4/2015 | Kaiser et al. |
| 2016/0134009 | A1 | 5/2016 | Sabah |

FOREIGN PATENT DOCUMENTS

| JP | 3754202 B2 | 3/2006 |
| JP | 2009133501 A | 6/2009 |
| WO | WO2013026767 A1 | 2/2013 |

* cited by examiner

*Primary Examiner* — Christopher S Kim
(74) *Attorney, Agent, or Firm* — Dority & Manning, P.A.

(57) ABSTRACT

A range appliance and sensor assembly are provided herein. The range appliance may include a top panel, a backsplash, an acoustic wave reader, and a surface acoustic wave (SAW) temperature sensor. The top panel may support a cooking utensil. The top panel may include a top surface and a bottom surface. The backsplash may extend above the top surface along a vertical direction. The acoustic wave reader may be mounted to the backsplash. The SAW temperature sensor may be disposed above the top surface along the vertical direction. The SAW sensor may be in operable communication with the acoustic wave reader.

12 Claims, 5 Drawing Sheets

RANGE APPLIANCE AND SENSOR ASSEMBLY

FIELD OF THE INVENTION

The present subject matter relates generally to cooking appliances, and more particularly to range appliances having one or more sensor assemblies.

BACKGROUND OF THE INVENTION

Cooktop or range appliances can include a variety of configurations for the heating elements located on the range surface. The number of heating elements or positions available for heating on the range appliance can include e.g., four, six, or more depending upon the intended application and preferences of the buyer. These heating elements can vary in size and location along the surface of the range appliance. Further, the types of heating elements available include, for example, gas burning, electric resistance (e.g., hot coil), electric radiant, and induction.

Cooktops have traditionally relied upon an operator to monitor temperatures during use. Attention to whether food is boiling, simmering, or otherwise at a certain temperature (e.g., for a certain period of time) can be important for determining whether proper cooking has occurred. Uniformity of temperature throughout food during cooking can be important in determining, for instance, whether scorching or proper cooking is occurring. Temperature monitoring is also needed to ensure cooking oils or other substances do not reach an unsafe temperature. Similarly, certain utensils and range surfaces may require protection from higher temperatures.

Although a thermometer may be placed on an appliance surface, utensil, or food item to detect the temperature thereof, a user must generally monitor the displayed temperature and adjust heat accordingly. Some existing systems have an electronic temperature probe for mounting on a utensil. However, such systems generally require an incorporated power source, such as a battery. Ambient heat, such as the waste heat of a heating element, may adversely affect the performance of the temperature probe. Further systems have a receiver that is permanently mounted below a cooking surface, e.g., below the utensils for cooking. However, the presence of a utensil near the receiver may cause interference. Moreover, the receiver might incur damage caused, e.g., by food or liquid spilled from a utensil above the receiver.

Accordingly, an apparatus for detecting temperatures on a range appliance without the use of batteries would be useful. More specifically, an apparatus for detecting the temperature of a heating element, utensil, and/or food item that is configured to prevent interference or damage from items placed on the range appliance would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure a range appliance is provided. The range appliance may include a top panel, a backsplash, an acoustic wave reader, and a surface acoustic wave (SAW) temperature sensor. The top panel may support a cooking utensil. The top panel may include a top surface and a bottom surface. The backsplash may extend above the top surface along a vertical direction. The acoustic wave reader may be mounted to the backsplash. The SAW temperature sensor may be disposed above the top surface along the vertical direction. The SAW sensor may be in operable communication with the acoustic wave reader.

In another aspect of the present disclosure a range appliance is provided. The range appliance may include a top panel, an acoustic wave reader, a surface acoustic wave (SAW) temperature sensor, and a controller. The top panel may include top surface and a bottom surface. The acoustic wave reader may be disposed above the top surface along the vertical direction. The SAW temperature sensor may be disposed above the top surface along the vertical direction. The SAW sensor may be in operable communication with the acoustic wave reader. The controller may be in operable communication with the acoustic wave reader to receive a temperature signal therefrom.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
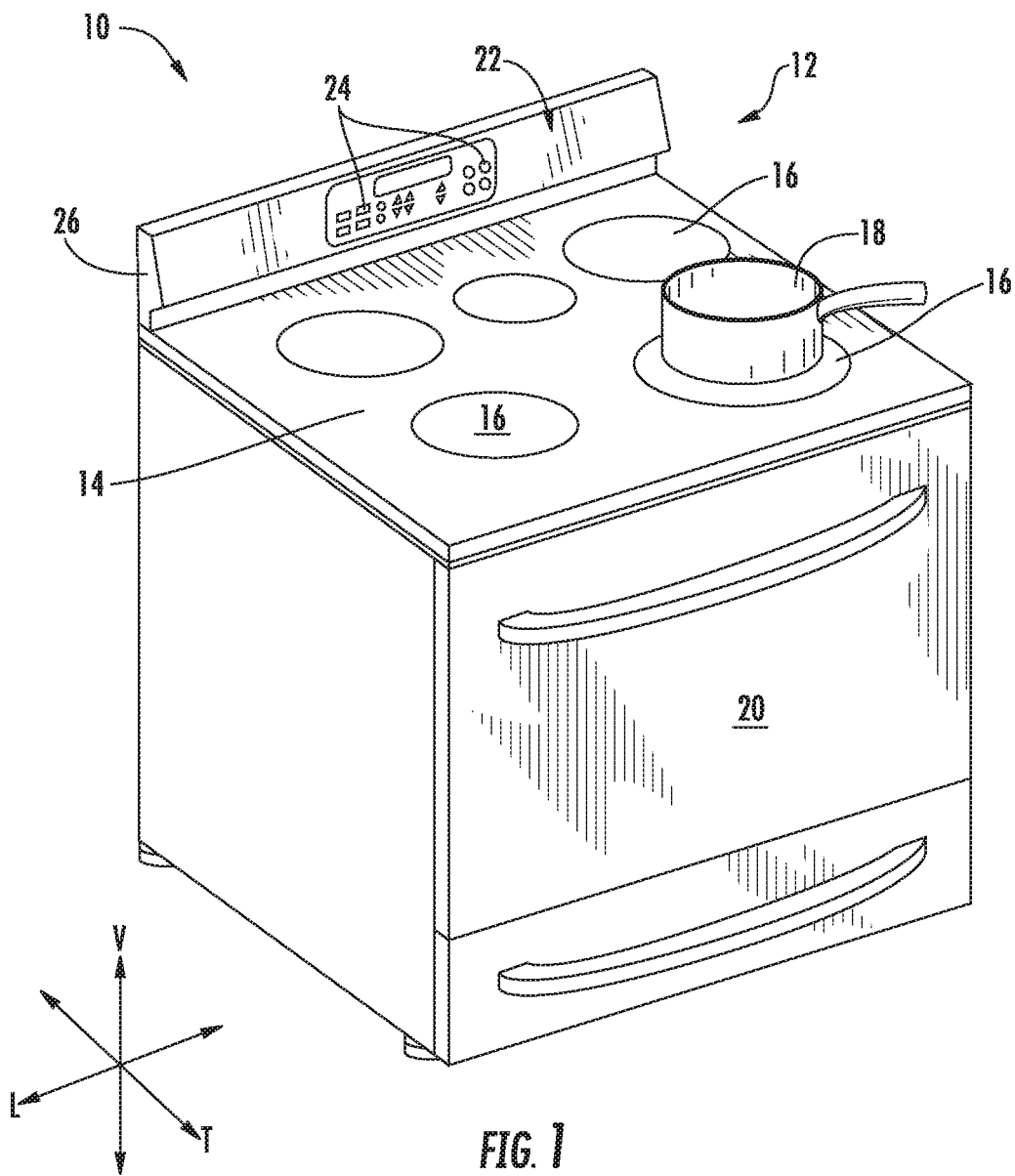
FIG. 1 provides a perspective view of a range appliance according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, a range appliance that includes a temperature sensor is provided in some aspects of the present disclosure. The temperature sensor may be a surface acoustic wave (SAW) temperature sensor that can wirelessly communicate with a controller of the range appliance. An acoustic wave reader may be provided to receive signals from the SAW temperature sensor. The acoustic wave reader may be positioned or mounted above a heating assembly or burner. Moreover, one or more operations of the range appliance may be changed automatically based on the signals received by the heating assembly.

Figure 2:
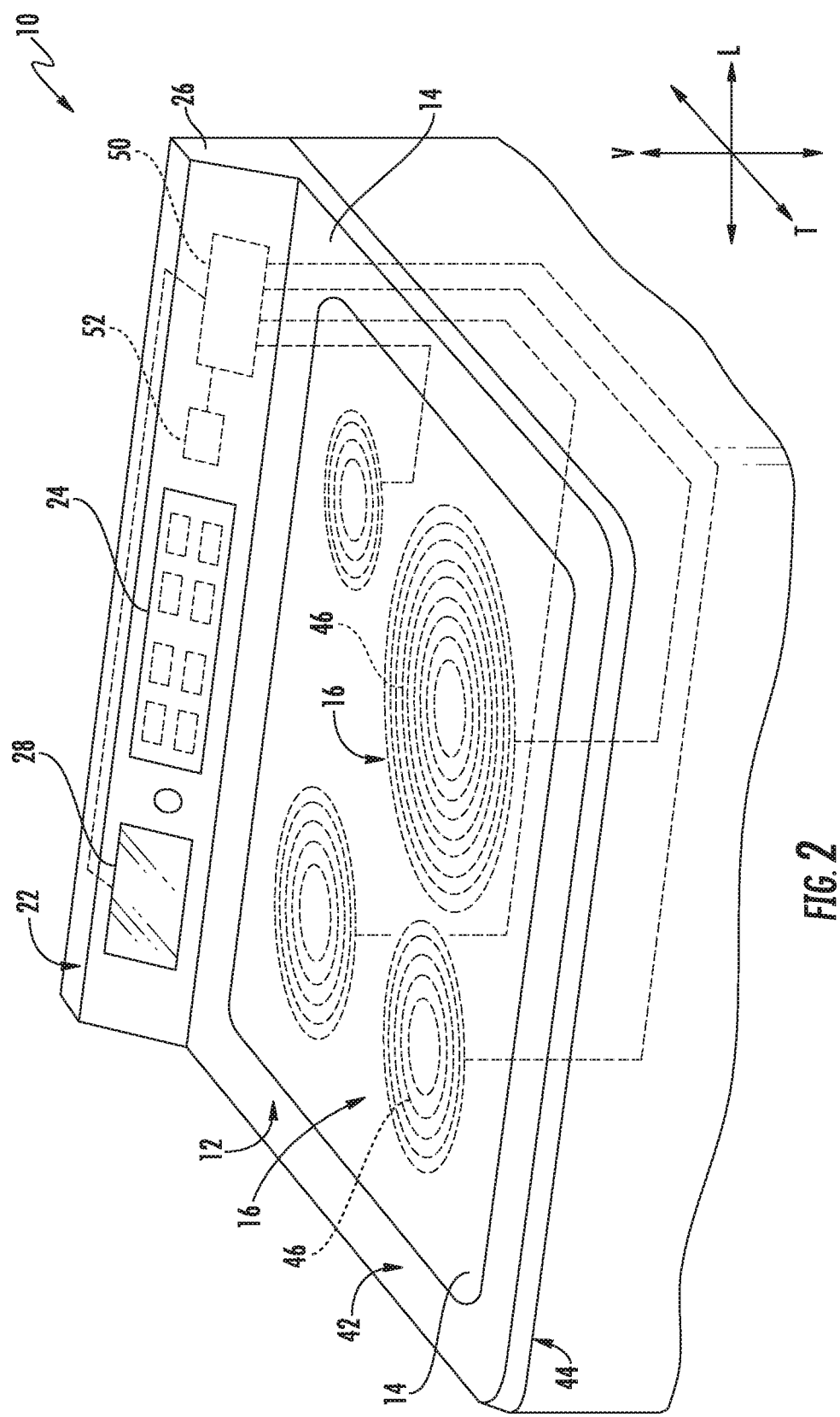
FIG. 2 provides a perspective view of a portion of the example range appliances of FIG. 1.

Turning now to the figures, FIGS. 1 and 2 provide perspective views of a range appliance 10 according to example embodiments of the present subject matter. Generally, range appliance 10 defines a vertical direction V, a lateral direction L, and a transverse direction T. The vertical direction V, the lateral direction L, and the transverse direction T are mutually perpendicular and form an orthogonal direction system. Range 10 is provided by way of example only and is not intended to limit the present subject matter to the arrangement shown in FIG. 1. Thus, the present subject matter may be used with other range 10 and/or cooktop 12 configurations, e.g., double oven range appliances, standalone cooktop appliances, cooktop range appliances without an oven, etc.

The range appliance 10 generally includes a cooktop 12. Cooktop 12 may be disposed on the cabinet 12 such that the total volume of cabinet 12 is generally divided between a cooking chamber (not pictured) and cooktop 12. A cooking utensil 18, such as a pot, pan, or the like, may be placed on a heating assembly 16 in order to heat the cooking utensil 18 and cook or heat food items placed in cooking utensil 18. Range appliance 10 also includes a door 20 that permits access to the cooking chamber of range appliance 10, e.g., for cooking or baking of food items therein.

As shown, cooktop 12 may include a top panel 14 to support a utensil 18 thereon. Top panel 14 generally includes a top surface 42 and an oppositely-disposed bottom surface 44. Bottom surface 44 may face the cooking chamber while top surface 42 is directed thereabove. Optionally, top panel 14 may be provided as a generally planar member. By way of example, top panel 14 may be constructed of glass, ceramics, enameled steel, and combinations thereof.

One or more heating assemblies 16 are provided on cooktop 12, e.g., above or below top panel 14. Each heating assembly 16 generally includes one or more heating elements 46, as shown in FIG. 2. For example, a heating assembly 16 may include a heating element 46 that is an electric heating element 46. In some such embodiments, heating element 46 is a radiant heating element. Additionally or alternatively, the cooktop 12 may include any other suitable type of heating element, such as a gas burner heating element, resistive heating element, or induction heating element. Each of the heating elements 46 may be the same type of heating element 46, or cooktop 12 may include a combination of different types of heating elements. Moreover, while shown with four heating assemblies 16, cooktop 12 may include any number of heating assemblies 16 in alternative example embodiments. Heating assemblies 16 can also have various diameters. For example, each heating element 46 of heating assemblies 16 can have a different diameter, the same diameter, or any suitable combination thereof.

Still referring to FIGS. 1 and 2 range appliance 10 may further include a user interface panel 22. In some embodiments, a backsplash 26 is provided on range appliance 10. Backsplash 26 may generally extend above top panel 14 in the vertical direction V, e.g., above a top surface 42 or vertical maximum of top panel 14. User interface panel 22 may be mounted on or within backsplash 26. Alternatively, user interface panel 22 may be positioned in another suitable location within convenient reach of a user of the range appliance 10.

User interface panel 22 is a component that allows a user to interact with the range appliance 10 to, for example, turn various heating elements (such as heating elements 46) on and off, adjust the temperature of the heating elements, set built-in timers, etc. A user interface panel 22 may include a user interface element 24 and/or a graphical display 28, which may be separate from or integrated with the user interface element 24. The user interface element 24 may include analog control elements, e.g., knobs or dials, or may be all digital control elements, for example, a touchscreen comprising a plurality of elements thereon. Various commands for a user to select through such touching may be displayed by user interface element 24, and detection of the user selecting a specific command by touching a distinct location on the user interface element 24 may be detected by a controller 50, which is in communication (e.g., electrically coupled) with the user interface element 24, based on electrical signals from the user interface element 24. Graphical display 28 may deliver or display certain information to the user, which may be based on user selections and interaction with the user interface element 24. For instance, graphical display 28 may show information for whether a particular heating element 46 is activated and/or the level at which the heating element 46 is set.

Range appliance 10 may include a controller 50 which generally controls operation of the various components of the range appliance 10. Controller 50 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 50 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. User interface panel 22 and other components of range appliance 10 may be in communication with controller 50 via one or more signal lines or shared communication busses.

Notably, controller 50 may be in communication with the user interface element 24, graphical display 28, and/or one or more heating elements 46. Accordingly, input signals received from the user interface element 24 may be provided to and interpreted by controller 50, and controller 50 may output corresponding control signals to the heating elements to operate the heating elements as desired. Additionally, the controller 50 may include, or be connected to, one or more sensors or switches that transmit sensed values or discrete signals to controller 50. Optionally, controller 50 may output control signals, e.g., to the graphical interface 28 and/or heating elements 46, based on the sensed values or signals.

In some embodiments, an acoustic wave reader 52 may be provided. For instance, acoustic wave reader 52 may be disposed above top surface 42, e.g., in the vertical direction V. The acoustic wave reader 52 may be positioned proximate the user interface element 24, such as within the user interface panel 22. In some embodiments, acoustic wave reader 52 is mounted within backsplash 26. The acoustic wave reader 52 may be in communication with the controller 50 and, in some embodiments, is integrated with the controller 50, e.g., on a control board spaced from the heating element(s) 46, such as within user interface panel 22. When assembled, acoustic wave reader 52 is in operable communication with one or more temperatures sensors to receive one or more signals therefrom. As will be described in more detail below, controller 50 may be configured to automatically control a heat output of one or more heating assemblies 16 based on based on signal(s) received from acoustic wave reader 52.

Figure 3:
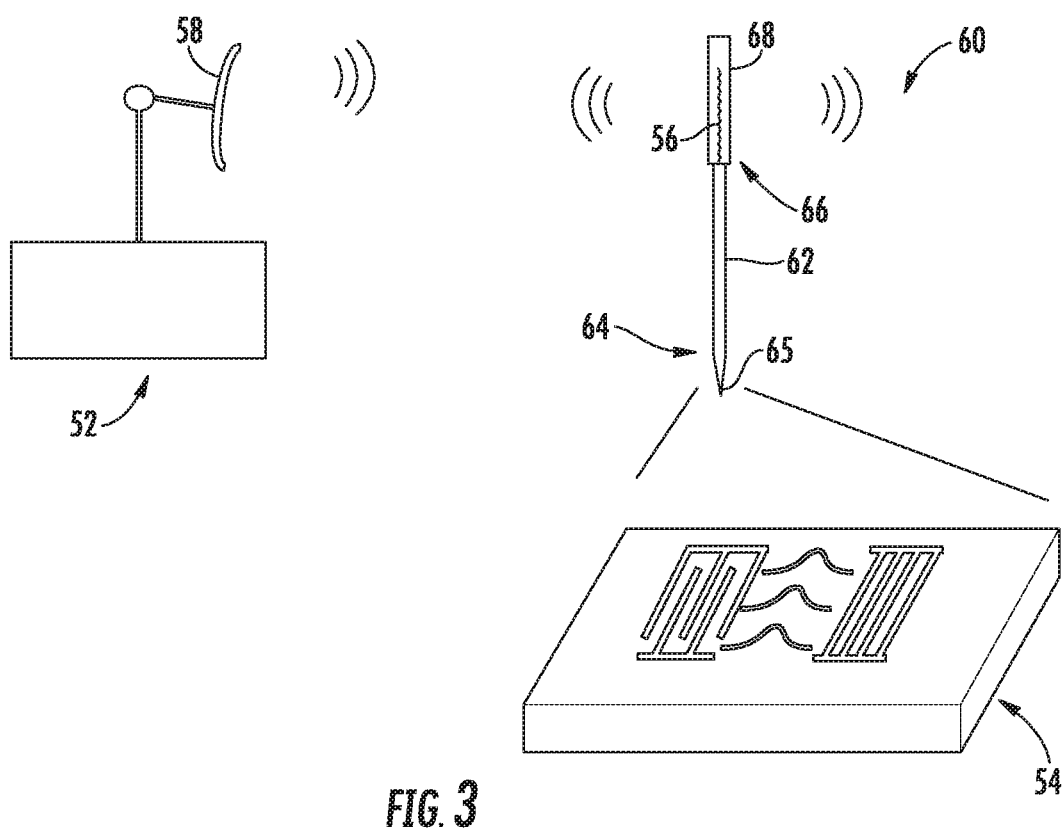
FIG. 3 provides a schematic view of a sensor assembly of a range appliance according to example embodiments of the present disclosure.
Figure 4:
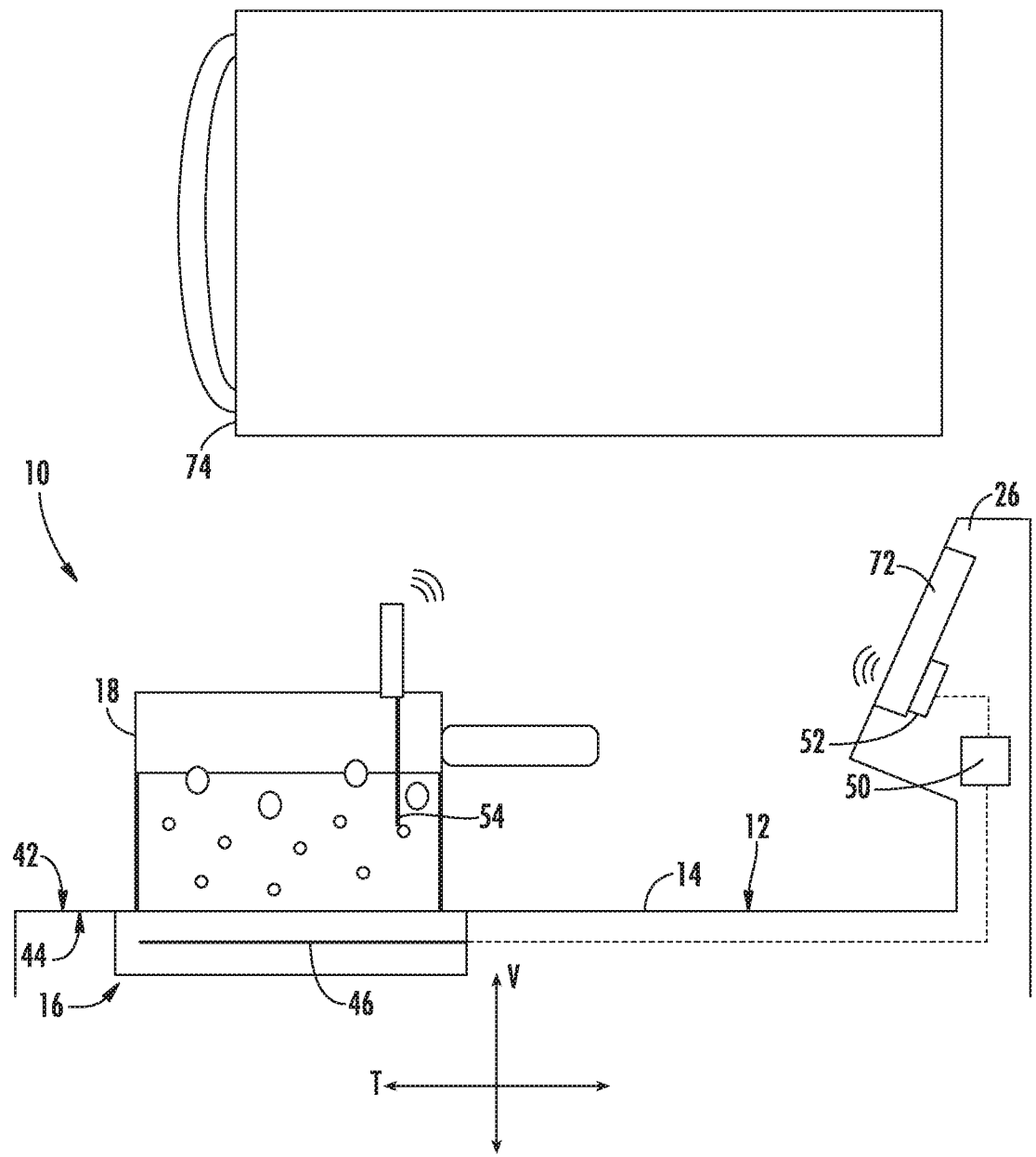
FIG. 4 provides a schematic view of a range appliance, including a sensor assembly, according to example embodiments of the present disclosure.

As illustrated in FIGS. 3 and 4, a surface acoustic wave (SAW) temperature sensor 54 is provided in some embodiments. SAW temperature sensor 54 may be configured to detect changes in temperature, e.g., through strain deformation induced by heat at SAW temperature sensor 54. SAW temperature sensor 54 is generally provided in operable communication with acoustic wave reader 52. For instance, a pair of coupled antennas 56, 58 may be provided. A sensor antenna 56 may be electrically coupled to SAW temperature sensor 54. A reader antenna 58 may be electrically coupled to acoustic wave reader 52. Together or in isolation, sensor antenna 56 and reader antenna 58 may permit or provide communication, e.g., wireless communication, between SAW temperature sensor 54 and acoustic wave reader 52.

During operation, SAW temperature sensor 54 may selectively receive and/or transmit signals from acoustic wave reader 52. For instance, an interrogation signal, e.g., electromagnetic pulse, may be transmitted from acoustic reader at reader antenna 58. The interrogation signal may be received at sensor antenna 56 and converted into a surface acoustic wave on SAW temperature sensor 54. Characteristics of the surface acoustic wave (e.g., frequency) may be varied according to the temperature detected at the SAW temperature sensor 54. A condition signal, e.g., a temperature signal, may be transmitted from the SAW temperature sensor 54 in response to the received interrogation signal. The condition signal may be received at acoustic wave reader 52. The condition signal may reflect the characteristics of the surface acoustic wave that was induced by the interrogation signal. Moreover, the condition signal may reflect changes or conditions at the SAW temperature sensor 54. Once received, the condition signal may be interpreted as temperature data (e.g., sensed values) and/or transmitted to controller 50. Advantageously, conversion of the interrogation signal and transmission of the condition signal may be performed without the use of an on-board power source or battery at the SAW temperature sensor 54.

As shown in FIG. 3, some embodiments of SAW temperature sensor 54 are housed within a food probe 60. For instance, SAW temperature sensor 54 may be embedded within one end portion 66 of food probe 60. Generally, food probe 60 may be provided as a narrow conductive shaft 62 having a sharpened tip 65 extending from the end portion 66 for insertion into a food item or liquid. A handle 68 may be attached to food probe 60, e.g., at an opposite end portion 68. In some such embodiments, sensor antenna 56 is housed within handle 68. Food probe 60 may extend into handle 68 and electrically couple SAW temperature sensor 54 to sensor antenna 56. Additionally or alternatively, a conductive wire or bus may electrically couple SAW temperature sensor 54 to sensor antenna 56.

Although FIG. 3 illustrates SAW temperature sensor 54 within food probe 60, additional or alternative embodiments of SAW temperature sensor 54 may directly engage a utensil 18. For instance, SAW temperature sensor 54 may be disposed on a utensil 18 in conductive thermal engagement therewith. When utensil 18 is placed on a heating assembly 16, heat may be conducted from a portion (e.g., a wall) of utensil 18 to SAW temperature sensor 54. Some embodiments may include a clip, mated groove, or another mechanical attachment mechanism to selectively attach SAW temperature sensor 54 to utensil 18. Alternatively, temperature sensor may be embedded within a utensil 18, e.g., in a wall thereof.

As illustrated in FIG. 4, in some embodiments, acoustic wave reader 52 is mounted within backsplash 26, e.g., in operable communication with controller 50. As shown, acoustic wave reader 52 may be mounted above a heating assembly 16 and distal to utensil 18. Utensils or items placed on cooktop 12 (e.g., at top panel 14) will advantageously avoid interfering with communication between SAW temperature sensor 54 and acoustic wave reader 52, e.g., irrespective of the position of SAW temperature sensor 54 above heating assembly 16.

A non-conductive surface panel 72 may extend over acoustic wave reader 52. For instance, non-conductive surface panel 72 may extend along the lateral direction L to cover acoustic wave reader 52. When assembled, non-conductive surface panel 72 may be positioned along a portion of backsplash 26. Specifically, non-conductive surface panel 72 may be between top panel 14 and backsplash 26, e.g., in the transverse direction T. Non-conductive surface panel 72 may be formed from a solid, substantially non-permeable material, such a glass material or plastic material. Signals transmitted to/from acoustic wave reader 52 may be permitted to pass through non-conductive surface panel 72. During use, non-conductive surface panel 72 may advantageously prevent foreign objects, e.g., spilled or sprayed liquids, from interfering with operation of acoustic wave reader 52.

Controller 50 may be assembled in operable communication with acoustic wave reader 52. For instance, controller 50 may be electrically coupled to acoustic wave reader 52. During operation, controller 50 may receive one or more temperature signals from acoustic wave reader 52. In some embodiments, controller 50 is configured to deliver a received temperature signal, e.g., to graphical display 28.

In optional embodiments, controller 50 is configured to automatically control heating assembly 16 in response to the temperature signals received from acoustic wave reader 52. As an example, a threshold value or value range, such as a predetermined baseline temperature, may be provided in controller 50 (e.g., within one or more memory units). Once received, temperature signal(s) may be actively compared to a predetermined baseline temperature.

In some embodiments, if it is determined that a received temperature signal is less than the predetermined baseline temperature, controller 50 may automatically increase the heat output of heating assembly 16. For example, controller 50 will initiate an increased heat output at the heating assembly 16 (e.g., wattage to the heating assembly 16 may be increased). In additional or alternative embodiments, if it is determined that a received temperature signal is above the predetermined baseline temperature, controller 50 may automatically decrease the heat output of heating assembly 16. For example, controller 50 will initiate a decreased heat output at the heating assembly 16 (e.g., wattage to the heating assembly 16 may be decreased or ceased).

Figure 5:
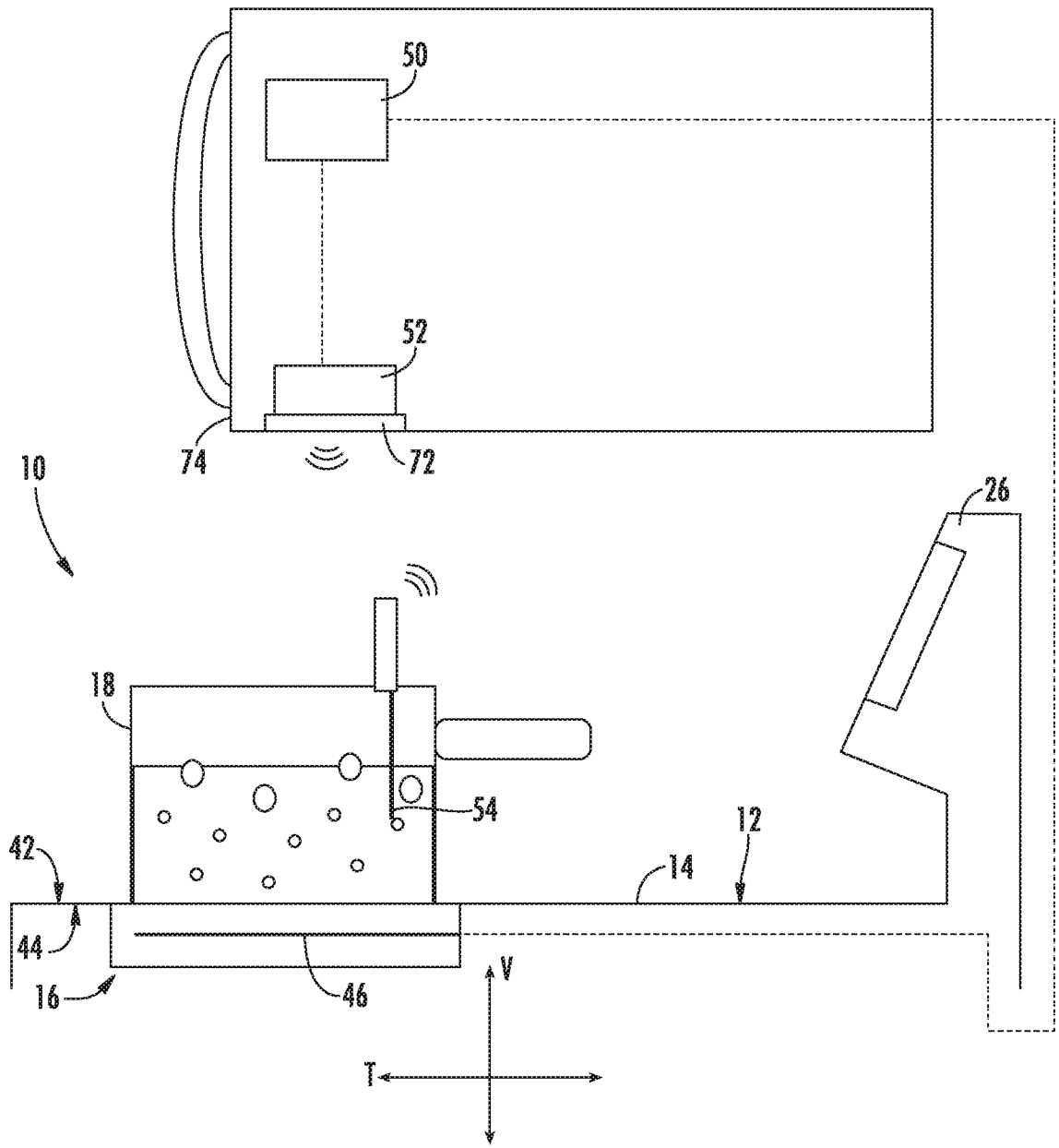
FIG. 5 provides a schematic view of a range appliance, including a sensor assembly, according to other example embodiments of the present disclosure.

As illustrated in FIG. 5, an appliance hood 74 may be provided to above a portion of range appliance 10. Specifically, appliance hood 74 may be disposed above the top panel 14, e.g., along the vertical direction V. Appliance hood 74 may include one or more blowers or fans (not pictured) to circulate air or remove heat and fumes. A microwave may optionally be included with appliance hood 74. In some embodiments, acoustic wave reader 52 is mounted to appliance hood 74. Acoustic wave reader 52 may be in operable communication with controller 50. For instance, acoustic wave reader 52 may be electrically coupled controller 50 or wirelessly connected to controller 50 via a wireless communications network. A non-conductive surface panel 72 may extend over and cover acoustic wave reader 52. For instance, non-conductive surface panel 72 may extend along the lateral direction L. When assembled, non-conductive surface panel 72 may be positioned along a portion of appliance hood 74. Specifically, non-conductive surface panel 72 may be between top panel 14 and appliance hood 74, e.g., in the vertical direction V. Non-conductive surface panel 72 may be formed from a solid, substantially non-permeable material, such a glass material or plastic material. Signals transmitted to/from acoustic wave reader 52 may thus pass through non-conductive surface panel 72. During use, non-conductive surface panel 72 may advantageously prevent foreign objects, e.g., sprayed liquids or fumes, from interfering with operation of acoustic wave reader 52.

Controller 50 may be in operable communication with acoustic wave reader 52. Moreover, controller 50 may be mounted within appliance hood 74, e.g., within a microwave control panel. Controller 50 may be electrically coupled to acoustic wave reader 52 therein. During operation, controller 50 may receive one or more temperature signals from acoustic wave reader 52. In optional embodiments, controller 50 may be configured to control heating assembly 16 in response to the temperature signals received from acoustic wave reader 52. As an example, a threshold value or value range, such as a predetermined baseline temperature, may be provided in controller 50 (e.g., within one or more memory units). The received temperature signal(s) may be actively compared to a predetermined baseline temperature.

In some embodiments, if it is determined that a received temperature signal is less than the predetermined baseline temperature, controller 50 may automatically increase the heat output of heating assembly 16. For example, controller 50 will initiate an increased heat output at the heating assembly 16 (e.g., wattage to the heating assembly 16 may be increased). In additional or alternative embodiments, if it is determined that a received temperature signal is above the predetermined baseline temperature, controller 50 may automatically decrease the heat output of heating assembly 16. For example, controller 50 will initiate a decreased heat output at the heating assembly 16 (e.g., wattage to the heating assembly 16 may be decreased or ceased).

Applicants note that although the controller 50 and acoustic wave reader 52 are illustrated in distinct locations in FIGS. 4 and 5, alternative embodiments may include different configurations. For instance, multiple acoustic wave readers 52 may be provided above the top panel 14 of range appliance 10. Optionally, at least one acoustic wave reader 52 mounted within backsplash 26 and at least one acoustic wave reader 52 may be mounted within appliance hood 74. Additionally or alternatively, an acoustic wave reader 52 may mounted within an appliance hood 74 may be in wireless communication with a controller 50 mounted within backsplash 26. Other suitable configurations, including combinations of the above-described embodiments may be provided without departing from the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A range appliance defining a vertical direction, the range appliance comprising:
    a top panel for supporting a cooking utensil, the top panel comprising a top surface and a bottom surface;
    a backsplash extending above the top surface along the vertical direction at a rear portion of the top panel;
    an acoustic wave reader mounted to the backsplash and configured to transmit an interrogation signal comprising an electromagnetic pulse;
    a surface acoustic wave (SAW) temperature sensor disposed above the top surface along the vertical direction, the SAW temperature sensor being in operable communication with the acoustic wave reader, the SAW temperature sensor comprising an interdigitated transducer configured to generate an acoustic wave in response to the interrogation signal; and
    a non-conductive surface panel mounted on the backsplash in front of the acoustic wave and rearward from at least a portion of the top panel.

2. The range appliance of claim 1, further comprising a sensor antenna electrically coupled to the SAW temperature sensor to provide communication between the SAW temperature sensor and the acoustic wave reader.

3. The range appliance of claim 1, further comprising a food probe housing the SAW temperature sensor.

4. The range appliance of claim 3, further comprising
    a handle attached to the food probe, and
    a sensor antenna housed within the handle and electrically coupled to the SAW temperature sensor to provide communication between the SAW temperature sensor and the acoustic wave reader.

5. The range appliance of claim 1, wherein the SAW temperature sensor engages the cooking utensil.

6. The range appliance of claim 1, wherein the non-conductive surface panel is a glass material.

7. The range appliance of claim 1, further comprising a heating assembly attached to the top panel, wherein the SAW temperature sensor is disposed above the heating assembly along the vertical direction.

8. The range appliance of claim 7, further comprising a controller in operable communication with the acoustic wave reader to receive a temperature signal therefrom.

9. The range appliance of claim 8, wherein the controller is in operable communication with the heating assembly, and wherein the controller is configured to control a heat output of the heating assembly.

10. The range appliance of claim 9, wherein the controller is configured to control the heat output of the heating assembly according to the temperature signal received from the acoustic wave reader.

11. The range appliance of claim 10, wherein the controller is further configured to increase the heat output of the heating assembly when the received temperature signal is less than a predetermined baseline temperature.

12. The range appliance of claim 10, wherein the controller is further configured to decrease the heat output of the heating assembly when the received temperature signal is less than a predetermined baseline temperature.

* * * * *